United States Patent [19]

Lesk

[11] 4,090,495
[45] May 23, 1978

[54] SOLAR ENERGY COLLECTOR

[75] Inventor: Israel Arnold Lesk, Scottsdale, Ariz.

[73] Assignee: Motorola, Inc., Schaumburg, Ill.

[21] Appl. No.: 796,254

[22] Filed: May 12, 1977

Related U.S. Application Data

[63] Continuation of Ser. No. 608,423, Aug. 28, 1975, abandoned.

[51] Int. Cl.² ............................................. F24J 3/02
[52] U.S. Cl. ..................................... 126/270; 126/271
[58] Field of Search ................................ 126/270, 271

[56] References Cited

U.S. PATENT DOCUMENTS

| | | | |
|---|---|---|---|
| 2,969,788 | 1/1961 | Newton | 126/271 |
| 3,089,670 | 5/1963 | Johnson | 126/270 |
| 3,929,122 | 12/1975 | Alkasab | 126/271 |
| 3,943,911 | 3/1976 | Yu | 126/271 |
| 3,951,129 | 4/1976 | Brantley, Jr. | 126/271 |
| 3,985,116 | 10/1976 | Kapany | 126/271 |
| 4,007,728 | 2/1977 | Guba | 126/270 |
| 4,019,496 | 4/1977 | Cummings | 126/271 |
| 4,030,477 | 6/1977 | Smith | 126/271 |

Primary Examiner—Lloyd L. King
Attorney, Agent, or Firm—Lowell E. Clark

[57] ABSTRACT

A solar energy collector comprising a collector plate having a solar energy absorbing surface; a first network of intersecting walls disposed on said collector plate and forming a plurality of cavities thereon; and a second network of three-dimensional members disposed on said first network, said three-dimensional members having reflective surfaces approximately parallel to said collector plate and reflective surfaces in two other dimensions, said three-dimensional members further defining apertures in each of said cavities for admitting incident solar radiation to said cavities. The collector utilizes the absorption advantages of a black body while surpassing the emission characteristics of a selective surface.

7 Claims, 3 Drawing Figures

SOLAR ENERGY COLLECTOR

This is a continuation of application Ser. No. 608,423, filed Aug. 28, 1975, now abandoned.

BACKGROUND OF THE INVENTION

This invention relates to a solar energy collector. More particularly, this invention relates to a flat plate collector having improved collection capabilities.

Flat plate solar energy collectors are well known in the art. Generally, they comprise a flat black collector surface spaced apart from a sheet of glass; the back surface is insulated to prevent heat loss. Solar radiation passes through the glass to the collector surface where it is absorbed and transformed to thermal energy. However, the "black" collector surface, while absorbing almost 100% of the incident solar radiation, suffers from the disadvantage that it emits in the infrared spectrum nearly 100% of the black body radiation corresponding to the temperature of the collector surface.

In order to obviate energy losses through emission, some prior art researchers advocate the use of "selective" collector surfaces. However, while such surfaces lower emission to about 10%, they absorb at best, only about 90% of the incident solar radiation. They may be expensive to apply and, in some cases, display instability under conditions encountered in use.

SUMMARY OF THE INVENTION

It is an object of this invention to provide an improved solar energy collector.

It is another object of this invention to provide a solar energy collector utilizing a black collector surface having decreased emission of radiation.

It is a still further object of this invention to provide a more efficient flat plate thermal solar energy collector of simple and inexpensive construction.

In accordance with this invention, a solar energy collector is provided which comprises a first means for absorbing solar energy; a second means for forming a plurality of cavities on said first means; and a third means disposed on said second means, said third means having reflective surfaces and defining apertures in said cavities for admitting incident solar radiation to said cavities. More particularly, the invention comprises a collector plate having a solar energy absorbing surface; a first network of intersecting walls disposed on said collector plate and forming a plurality of cavities thereon; and a second network of three-dimensional members disposed on said first network, said three-dimensional members having reflective surfaces approximately parallel to said collector plate, and reflective surfaces in two other dimensions, said three-dimensional members further defining apertures in each of said cavities for admitting incident solar radiation to said cavities.

The solar energy collector of this invention will be better understood by reference to the following description of the invention and the accompanying drawings.

DETAILED DESCRIPTION OF THE INVENTION

Figure 1:
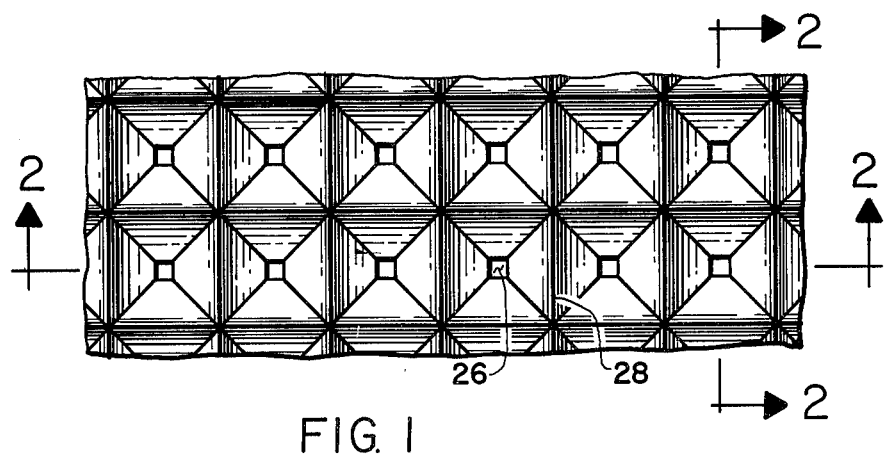
FIG. 1 is a top sectional view of a solar energy collector in accordance with this invention.
Figure 2:
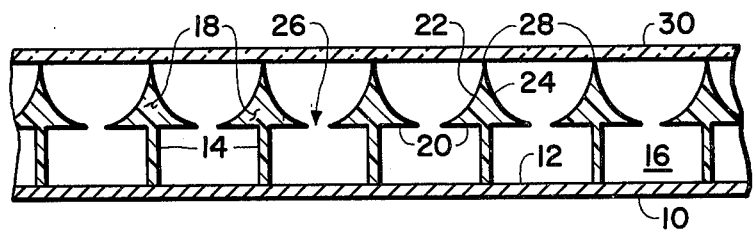
FIG. 2 is a cross-sectional vertical view along either of lines 2—2 of FIG. 1.

Referring to FIGS. 1 and 2, there is shown a solar energy collector having a collector plate 10. The collector plate is made of metal but could be made of plastic. Collector plate 10 has an absorbing surface 12. The absorbing surface is a black surface, that is, one which absorbs nearly 100% of all incident radiation. It is most readily achieved by applying an appropriate pigmented black paint to collector plate 10.

Disposed on the collector plate 10 is a network of intersecting walls 14. These walls are preferably made of a plastic which is a poor conductor of heat. Also, the plastic walls 14 preferably should be either transparent or reflective to the solar energy spectrum and the infrared spectrum emitted by the heated collector plate 10. The network serves to form a plurality of cavities 16 which reduce convection losses in the collector as will be apparent from a discussion of the function of the plate hereinafter. While square cavities are depicted in the drawings, the geometry is not critical to the function of the apparatus of this invention. Thus, the network of walls can form other rectangular shapes, diamonds, etc. Furthermore, the network can be formed as an integral structure, for example, by molding, or it can be fabricated from separate walls by gluing or other appropriate means. The network is secured to the collector plate by gluing, if desired, but it can be simply placed thereon and retained by the sidewalls of the device (not shown).

A second network of three-dimensional members 18 is disposed on the network of intersecting walls 14. These three-dimensional members may be made of any suitable material but preferably are made of plastic having metallized surfaces in order to provide reflecting surfaces 20, 22 and 24. Reflecting surfaces 20 are parallel to the collector plate 10 and are positioned on the walls 14. Surfaces 22 and 24 define a plurality of apertures 26 for channeling incident solar radiation into cavities 16. Preferably, as shown in FIG. 2, reflecting surfaces 22 and 24 are shaped so as to form a parabola in connection with apertures 26. It is also preferred that surfaces 22 and 24 meet at point 28, these points defining a plane parallel to collector plate 10. Three dimensional members 18 can comprise discrete members or can be an integral structure made by molding an appropriate plastic. Furthermore, similar to the network of intersecting walls 14, these three-dimensional members 18 can either be placed on the network of intersecting walls 14 or secured thereto such as by an adhesive. Furthermore, it is contemplated to form both the network of intersecting walls 14 and the network of three dimensional members 18 as a unitary integrated structure.

Fitted on the top of the three-dimensional members 18 is a cover 30 consisting of a thin sheet of clear glass or plastic.

In constructing the collector of this invention, it is preferred that the height of intersecting walls 14, the distance between points 28 of three-dimensional members 18, and the height of the three-dimensional members all be from about ¼ inch to about 2 inches. It is most preferred to construct the collector so that the height of walls 14 is about 1 and ½ inch, the distance between points 28 is about 1 inch and the height of the three dimensional members 18 is about 1 and ⅛ inches. Furthermore, while the number of cavities in each device is dependent only on the amount of energy desired to be collected, it will be appreciated from this discussion of dimensions that the device is a mini-trough type array having a large number of reflecting surfaces. For example typical collectors could range in size from about 2 feet by 4 feet to about 3 feet by 12 feet, the side walls being made of metal or plastic and the cover plate being about ⅛ inch thick.

In operation, the sun's incident radiant energy passes through cover 30. Some of the radiation is channeled down directly through apertures 26. The remaining incident energy impinges on reflecting surfaces 22 and 24. The rays are reflected from these surfaces and bounce back and forth, eventually passing through apertures 26. All the radiation passing through apertures 26 impinges on absorbing surface 12. Since absorbing surface 12 is a black body, it absorbs all of the impinging solar radiation. This heats the collector plate 10, and it emits infrared radiation according to the well-known spectrum of a black body at the same temperature. However, the construction of this device, by providing surfaces 20, with small apertures 26, functions to reflect most of the energy emitted from the black surface. Thus, most of the emitted radiation will hit surfaces 20 and be reflected therefrom back to absorbing surface 12, this function in effect providing a highly efficient system since the absorbtion advantages of a black body are utilized while surpassing the emission characteristics of a selective surface. The heat energy in the collector plate is then utilized in any conventional manner. Thus, it can be employed to heat water, to heat air, etc.

Figure 3:
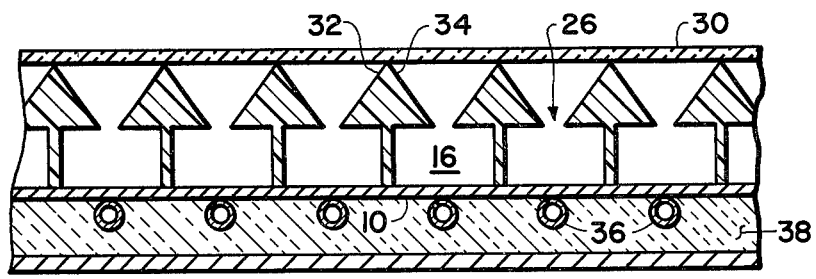
FIG. 3 is a cross-sectional vertical view of another embodiment of a collector in accordance with this invention further including means for utilizing the collected energy.

A modified form of the invention is shown in FIG. 3 wherein reflecting surfaces 32 and 34 define straight lines. Furthermore, FIG. 3 illustrates the use of this invention as a source of heat for a water heating system. Thus, water flowing through pipes 36 is heated by absorbing energy from collector plate 10 with which they are in good thermal contact. Heat loss from the back surface is prevented by insulation 38.

Although the invention has been described in connection with certain preferred embodiments, it is not intended that the invention be limited thereto. Thus, it is intended that the invention cover all alternatives, arrangements, equivalents, and embodiments as may be included in the scope of the following claims.

What is claimed is:

1. A solar energy collector comprising:
   a collector plate having a solar energy absorbing surface;
   a first network of transparent or reflective intersecting walls disposed on said collector plate and forming a plurality of cavities thereon; and
   a second network of three-dimensional members disposed on said first network, said three-dimensional members having first reflective surfaces approximately parallel to but spaced from said collector plate, said three-dimensional members further having other reflective surfaces which meet to define a plane parallel to said collector plate, said other surfaces meeting said first surfaces to define apertures in said cavities for admitting incident solar radiation to said cavities.

2. The solar energy of claim 1 further including a transparent plate disposed on said second network.

3. The solar energy collector of claim 1 where said other surfaces of said three-dimensional members define parabolas with said apertures.

4. The solar energy collector of claim 1 where said other surfaces define places terminating in said apertures.

5. The solar energy collector of claim 4 further including a transparent plate disposed on said second network.

6. The solar energy collector of claim 1 wherein said first network comprises an integrated structure.

7. The solar energy collector of claim 1 wherein said networks together comprise an integrated structure.

* * * * *